(12) United States Patent
Choi

(10) Patent No.: US 8,576,583 B2
(45) Date of Patent: Nov. 5, 2013

(54) SAMPLED CHARGE CONTROL FOR RESONANT CONVERTER

(75) Inventor: Hangseok Choi, Bedford, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 348 days.

(21) Appl. No.: 12/884,874

(22) Filed: Sep. 17, 2010

(65) Prior Publication Data

US 2012/0069605 A1   Mar. 22, 2012

(51) Int. Cl.
*H02M 3/335* (2006.01)
*G05F 1/575* (2006.01)

(52) U.S. Cl.
USPC .................. 363/21.02; 323/283; 323/284

(58) Field of Classification Search
USPC ............. 363/15, 16, 21.02, 97; 323/283, 284, 323/285
See application file for complete search history.

(56) References Cited

U.S. PATENT DOCUMENTS

| 4,700,113 | A  | * | 10/1987 | Stupp et al. | 315/224 |
| 7,180,273 | B2 | * | 2/2007 | Bocchiola et al. | 323/207 |
| 7,660,136 | B2 | * | 2/2010 | Yang | 363/21.06 |

OTHER PUBLICATIONS

"L6599: High-Voltage Resonant Controller", Rev. 3, [Online]. Retrieved from the Internet: <URL: www.st.com>, (Feb. 2009), 36 pgs.

* cited by examiner

*Primary Examiner* — Gary L Laxton
(74) *Attorney, Agent, or Firm* — Schwegman Lundberg Woessner P.A.

(57) ABSTRACT

This document discusses, among other things, apparatus and methods for controlling a converter. In an example, a voltage-controlled oscillator (VCO) can be configured to provide a first pulse train to control the converter. The frequency of the first pulse train of the VCO can be modulated using information indicative of an operating condition of the converter to maintain a desired DC voltage at an output. In an example, the VCO can include a frequency divider configured to provide a second pulse train to the output using information from the first pulse train.

20 Claims, 7 Drawing Sheets

SAMPLED CHARGE CONTROL FOR RESONANT CONVERTER

BACKGROUND

Resonant converters can be used to convert power from voltage source to direct current (DC) voltage and current. Half-bridge or full bridge resonant converters can convert AC or DC input power into a regulated DC power. However, changes in input line conditions or output load conditions can cause the DC output of the converter to fluctuate. Because of complex poles and high Q of the transfer functions associated with resonant converters, output voltage and various currents of resonant converters can overshoot when the converter responds to changing operating conditions, such as changing input line conditions or output load conditions.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

OVERVIEW

Figure 1:
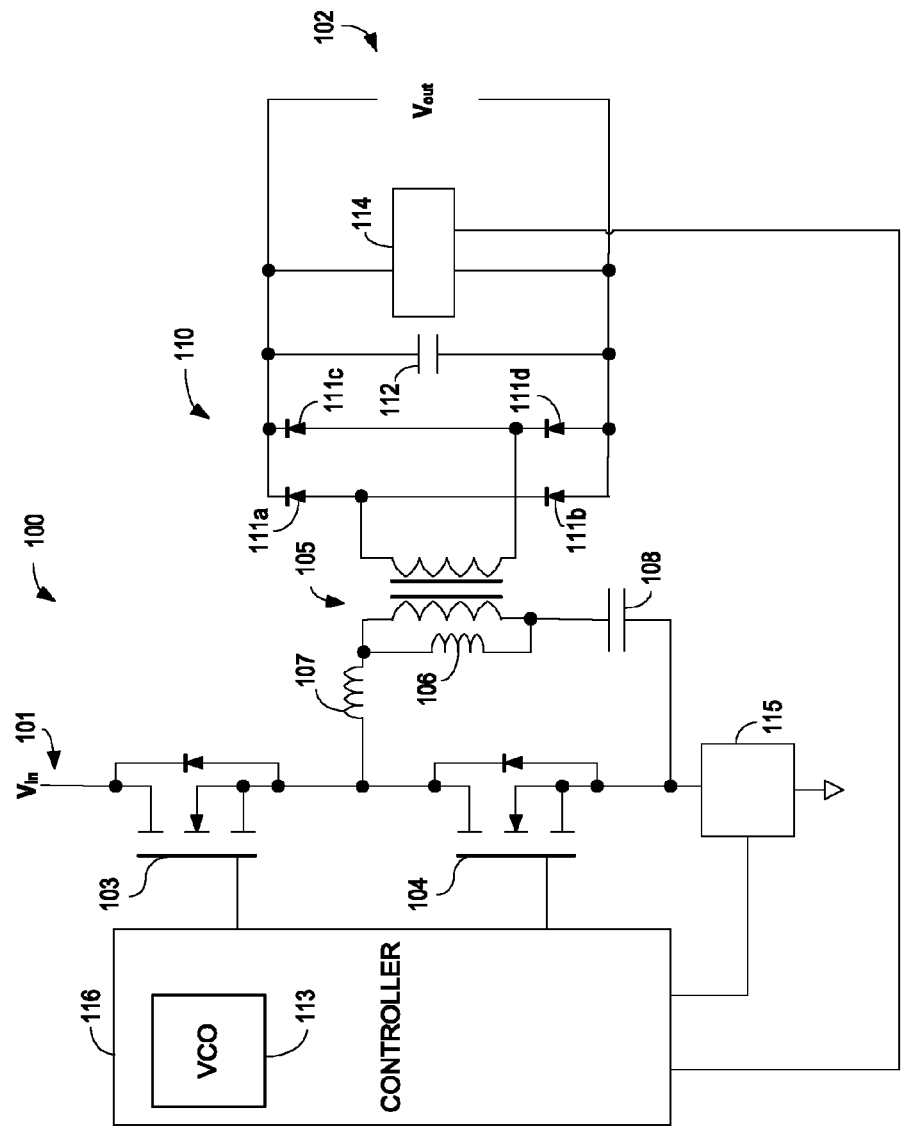
FIG. 1 illustrates generally an Inductor-Inductor-Capacitor (LLC) resonant converter according to one example of the present subject matter.

The present inventor has recognized, among other things, an improved control apparatus and method for resonant converters including half-bridge and full-bridge resonant converters. In an example, an apparatus can include a first input configured to receive first information indicative of an operating condition of a converter and an output configured to couple to a switch of the converter. In an example the apparatus can include a voltage-controlled oscillator (VCO) configured to provide a first pulse train having a first frequency, and to modulate the first frequency responsive to the first information. In an example, the apparatus can include a frequency divider configured to provide a second pulse train to the output, the second pulse train having a second frequency lower than the first frequency.

In Example 1, an apparatus to control a converter includes a first input configured to receive first information indicative of an operating condition of the converter, an output configured to couple to a switch of the converter, a voltage-controlled oscillator (VCO) configured to provide a first pulse train having a first frequency, and to modulate the first frequency responsive to the first information, and a frequency divider configured to provide a second pulse train to the output, the second pulse train having a second frequency lower than the first frequency.

In Example 2, the first information of Example 1 optionally includes information indicative of an output voltage of the converter.

In Example 3, the first information of any one or more of Examples 1-2 optionally includes information indicative of conduction current (e.g., integration of conduction current) of an inductor of the converter.

In Example 4, the apparatus of any one or more of Examples 1-3 optionally includes a second input circuit configured to receive second information indicative of an operating condition of the converter.

In Example 5, the apparatus of any one or more of Examples 1-4 optionally includes an inductor, wherein the first information of any one or more of Examples 1-4 optionally includes information indicative of an output voltage of the converter, and wherein the second information if any one or more of Examples 1-4 optionally includes information indicative of conduction current of the inductor.

In Example 6, the VCO of any one or more of Examples 1-5 is optionally configured to adjust the first frequency using the first information and the second information.

In Example 7, the VCO of any one or more of Examples 1-6 optionally includes a threshold comparator to generate the first pulse train, and wherein the VCO of any one or more of Examples 1-6 is optionally configured to adjust a threshold input of the threshold comparator in response to the first information.

In Example 8, the VCO of any one or more of Examples 1-7 is optionally configured to provide the first pulse train using a triangular waveform having a ramp rate and to adjust the ramp rate in response to the received information.

In Example 9, the output of any one or more of Example 1-8 optionally includes first and second outputs, the first output coupled to a first switch of the converter, and the second output coupled to a second switch of the converter, and wherein the second frequency is about half of the first frequency to equalize the duty cycle of the first and second switches.

In Example 10, a method to control a converter includes receiving first information indicative of an operating condition of the converter, providing a first pulse train having a first frequency using a voltage-controlled oscillator (VCO), modulating the first frequency in response to the received information, providing a second pulse train to an output coupled to a switch of the converter, and adjusting a second frequency of the second pulse train using the first pulse train and a frequency divider.

In Example 11, the receiving first information of any one or more of Examples 1-10 optionally includes sensing a voltage indicative of current flow through a primary winding of a transformer of the converter while the switch is conducting.

In Example 12, the sensing a voltage indicative of current flow of any one or more of Example 1-11 optionally includes sensing a resistor voltage indicative of current flow through the primary winding, generating a current proportional to the resistor voltage, charging a feedback capacitor using the proportional current, sampling and holding a value of a voltage of the feedback capacitor when a second switch of the resonant converter is conducting, and processing the sampled value with a threshold reference value to set a threshold of the VCO.

In Example 13, the receiving first information of any one or more of Examples 1-12 optionally includes sensing error information indicative of an error between an output voltage of the resonant converter and a desired output voltage.

In Example 14, the method of any one or more of claims 1-13 optionally includes sensing a voltage indicative of current flow through a primary winding of a transformer of the resonant converter when the switch is conducting.

In Example 15, the sensing the voltage indicative of current flow of any one or more of Examples 1-14 optionally includes holding a value of the sensed voltage when a second switch of the resonant converter is conducting, and processing the held value with the error information to set a threshold of the VCO.

In Example 16, the modulating the first frequency of any one or more of Examples 1-15 optionally includes adjusting a ramp rate of the VCO using the error information.

In Example 17, the adjusting the second frequency of any one or more of Examples 1-16 optionally includes dividing the first frequency of the first pulse train by two using the first pulse train and the frequency divider.

In Example 18, a system includes a converter including a transformer, first and second switches coupled to the transformer, where the first and second switches are configured to provide a first alternating current (AC) signal to a primary winding of the transformer, and an output rectifier configured to rectify a second alternating signal from a secondary winding of the transformer to generate a direct current (DC) voltage at an output of the converter. The system can further include a controller coupled to control inputs of the first and second switches, the controller configured to switch the first and second switches in a complementary fashion to generate the first AC signal, wherein the controller includes a voltage-controlled oscillator (VCO) configured to provide a first pulse train at a first frequency and a second pulse train at a second frequency to control the switching of the first and second switches, and wherein the second frequency is about half of the first frequency to equalize a duty cycle of the first and second switches. The system can further include a first sensor circuit configured to sense an operating condition of the converter and to adjust the first frequency of the VCO each switch cycle of the first switch in response to the sensed operating condition to maintain a desired DC voltage at the output of the converter.

In Example 19, the first sensor circuit of any one or more of Examples 1-18 optionally includes a voltage sensor coupled to the output rectifier, the voltage sensor configured to provide error information using a comparison of the desired DC voltage and the DC voltage at the output of the converter.

In Example 20, the first sensor circuit of any one or more of Examples 1-19 is optionally configured to adjust a threshold of the VCO using to the error information.

In Example 21, the VCO of any one or more of Examples 1-20 optionally includes a charging circuit and the threshold of any one or more of the Examples 1-20 optionally includes an upper threshold of the charging circuit.

In Example 22, the VCO of any one or more of Examples 1-21 optionally includes a charging circuit, and the first sensor circuit of any one or more of Examples 1-21 is optionally configured to adjust a ramp rate of the charging circuit using the error information.

In Example 23, the converter of any one or more of Examples 1-22 optionally includes an inductor, and the first sensor circuit of any one or more of Examples 1-22 optionally includes a current sensor configured to sense the inductor current during a conduction cycle of the first switch.

In Example 24, the converter of any one or more of Examples 1-23 optionally includes a resonant capacitor, and the current sensor of any one or more of Examples 1-23 optionally includes a resistive load coupled in series with the resonant capacitor.

In Example 25, the converter of any one or more of Examples 1-24 optionally includes a resonant capacitor, and the current sensor of any one or more of Examples 1-24 optionally includes a capacitive voltage divider coupled in parallel with the resonant capacitor.

In Example 26, an apparatus can optionally include means for performing any one or more the functions of Examples 1-25.

This overview is intended to provide an overview of subject matter of the present patent application. It is not intended to provide an exclusive or exhaustive explanation of the invention. The detailed description is included to provide further information about the present patent application.

DETAILED DESCRIPTION

The present subject matter includes apparatus and methods for improved response of a converter, such as a resonant converter, including but not limited to, half or full-bridge resonant converters. Traditional control methods for resonant converters generally provide limited transient response to changing output load and input source conditions because of, for example, complex poles or high Q converter transfer functions. The apparatus and methods of the present subject matter can implement voltage feedback and line voltage feed forward to increase or reduce the converter gain automatically in response to changes in line voltage or load conditions. Such gain correction can reduce input current and output voltage overshoot of the LLC resonant converter without directly sensing the line voltage. In certain examples, the apparatus and method can split the complex double poles of the converter transfer function into two real poles, thus simplifying control loop design and providing better transient response.

FIG. 1 illustrates generally an example of an Inductor-Inductor-Capacitor (LLC) resonant converter 100 according to one example of the present subject matter. The LLC resonant converter 100 can be configured to receive a voltage $V_{in}$ at an input 101 of the converter 100 and provide a direct current (DC) voltage $V_{out}$ at an output 102 of the converter 100. The illustrated LLC resonant converter 100 includes a half-bridge LLC resonant converter. The LLC resonant converter 100 can include a first switch 103 and a second switch 104 configured to provide an alternating current waveform, such as a high frequency waveform, on the primary winding of a transformer 105. The converter 100 can include a resonant network including a magnetizing inductor 106, a resonant inductor 107 and a resonant capacitor 108. In some examples, an integrated transformer can include the magnetizing inductor and the resonant inductor. In certain examples, an integrated transformer can include the resonant network. The LLC resonant converter can include a rectifier network 110 for providing the DC voltage $V_{out}$ at the output 102. The rectifier network 110 can include rectifier diodes 111a-d and an output capacitor 112 coupled to the secondary winding of the transformer 105. The LLC resonant converter 100 can also include a controller 113 to switch the first switch 103 and second switch 104 to provide a desired DC voltage at the output 102 over a range of operating conditions including, but not limited to, a range of load conditions and varying input line conditions, such as varying input voltage. The LLC resonant converter 100 can include an output voltage sensor 114 to measure the DC voltage output 102. The controller can use the measured output voltage to control the switching of the first switch 103 and the second switch 104 to provide a desired DC output voltage at the output 102 of the converter 100.

The LLC resonant converter 100 can include a current sensor 115 to sense inductor current during the conduction cycle of the first switch 103. The sensed current can be indicative of changing line conditions such as varying input voltage. The sensed current can be received by the controller 113 and used to set the switching frequency of the first switch 103 and the second switch 104 to maintain a desired DC output voltage in response to the changing operating conditions, such as, but not limited to, changing input voltage. In various examples, the controller 113 can include a voltage-controlled oscillator (VCO) 116 to provide a switching frequency of the first switch 103 and the second switch 104. In certain examples, operating parameters of the VCO 116 can be adjusted to maintain a desired voltage at the output 102 of the converter 100 over a range of load conditions. The operating parameters of the VCO can include, but are not limited to a charging circuit ramp rate, an upper threshold of a charging circuit, a lower threshold of a charging circuit, or combinations thereof.

Figure 2A:
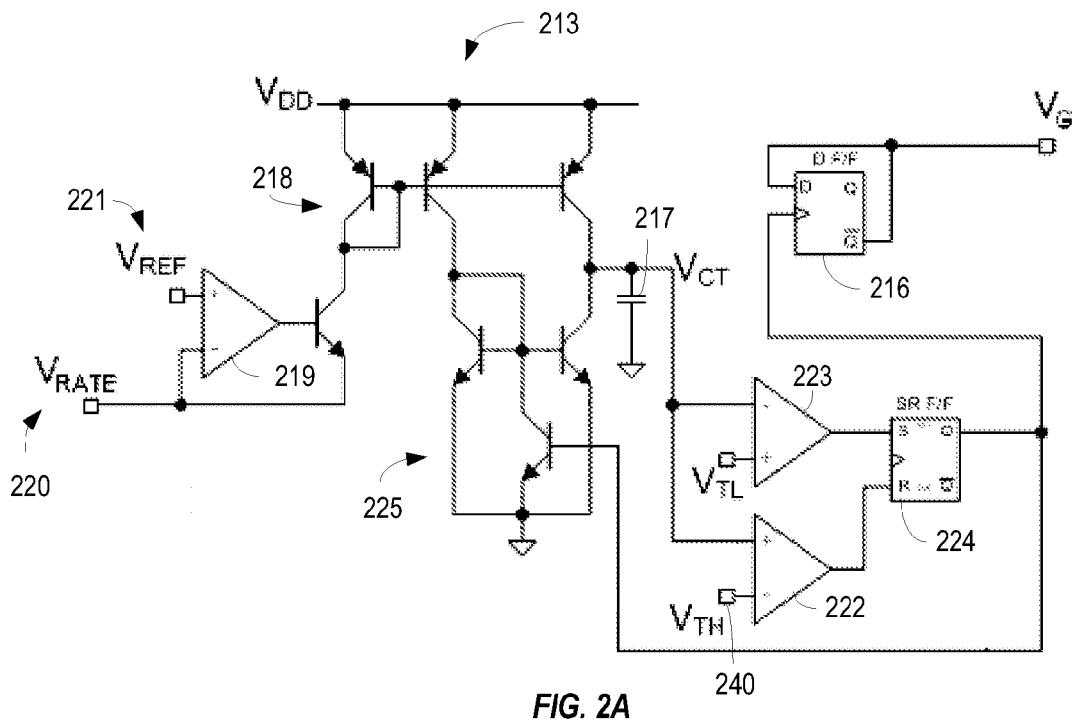
FIG. 2A illustrates generally a voltage-controlled oscillator (VCO) according to one example of the present subject matter.

FIG. 2A illustrates generally a VCO 213 according to one example of the present subject matter. The VCO 213 charges and discharges a VCO capacitor 217 to generate a triangular waveform. The rate of charging and discharging the VCO capacitor is set by a current mirror 218 responding to a sense current generated using a comparator 219. The output of the comparator 219 can indicate a difference between a rate setpoint 220 and a rate setpoint reference value 221. The capacitor 217 can charge to an upper value based on an upper threshold value $V_{TH}$. In an example, an upper comparator 222 toggles a "reset" input of a first flip-flop 224 as the voltage across the capacitor 217 reaches the upper threshold value 240. In an example, a lower comparator 223 toggles a "set" input of the first flip-flop 224 as the voltage across the capacitor 217 falls below a lower threshold value. An output of the first flip-flop 224 can provide a first pulse train having a first frequency. The first pulse train can control a second current mirror 225 to charge and discharge the capacitor 217. The pulse train can have a first frequency corresponding to the frequency of the triangular voltage waveform 226 generated across the VCO capacitor 217. In some examples, the triangular voltage waveform 226 can be used to switch a first switch and a second switch of a resonant converter.

In some examples, uneven switch duty cycle can cause current stress in components of a resonant converter. Such duty cycle variations can be caused by uneven charge and discharge rates of the VCO capacitor. For example, small manufacturing variations in the VCO components can cause discrepancies in the charge and discharge rate of the VCO capacitor even though the rate and threshold set points are held constant. To avoid such current stress, certain examples include a second flip-flop 216 to provide a frequency divider, such that the VCO provides a second pulse train to switch the switches of the resonant converter at a second frequency lower than the first frequency of the first pulse train. In certain examples the second frequency is about half of the first frequency.

Figure 2B:
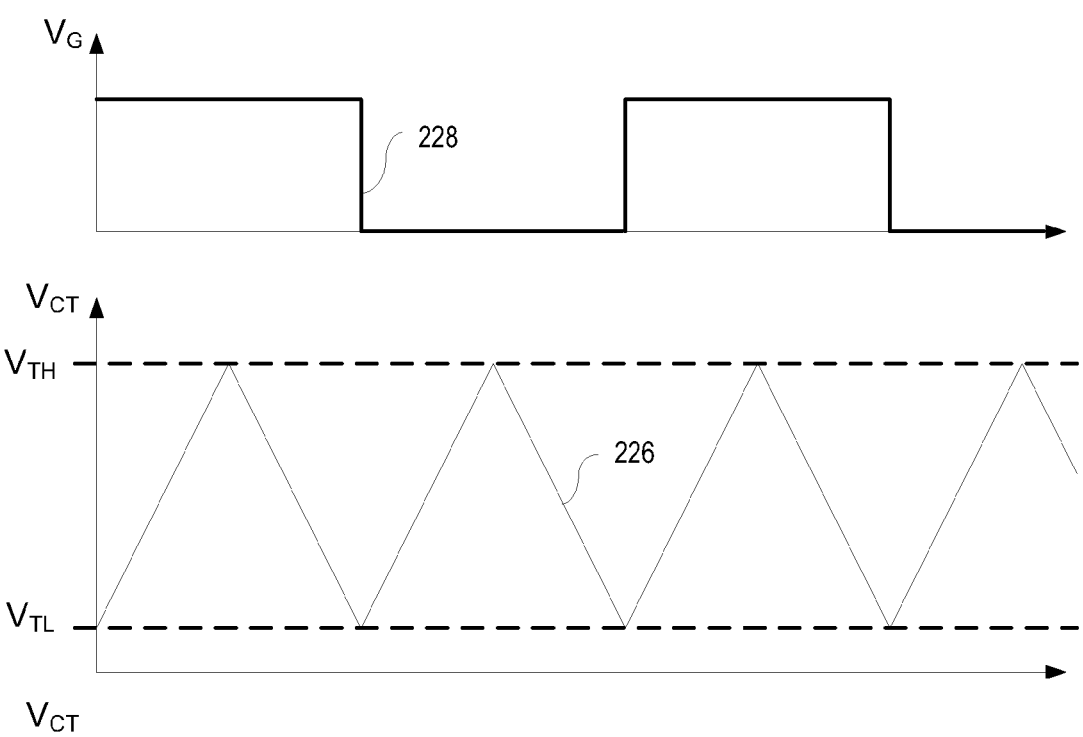
FIG. 2B illustrates generally a VCO capacitor waveform and a pulse train output waveform of a VCO having a second frequency divider flip-flop.
Figure 2C:
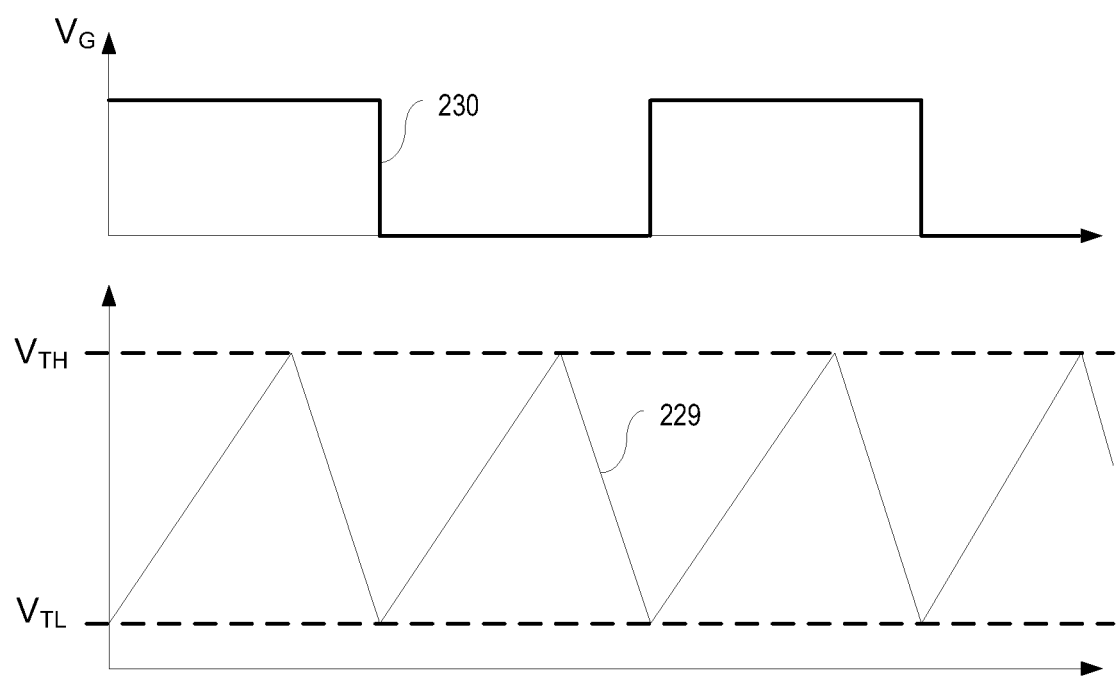
FIG. 2C illustrates generally an example of a waveform pattern that includes a discrepancy between the charge and discharge rate of a VCO capacitor.

FIG. 2B illustrates generally a VCO capacitor waveform 226 and a pulse train output waveform 228 of a VCO having a second frequency divider flip-flop 227, for example, the VCO illustrated in FIG. 2A. For reference, FIG. 2C illustrates a waveform pattern 229 that has a very large discrepancy between the charge and discharge rate of the VCO capacitor. Even with the large discrepancy, the frequency division provided by a second flip-flop 227 can produce a switch pulse waveform 230 with substantially equal duty cycles for the first switch and the second switch to avoid generating current stress in an LLC resonant converter.

Figure 3:
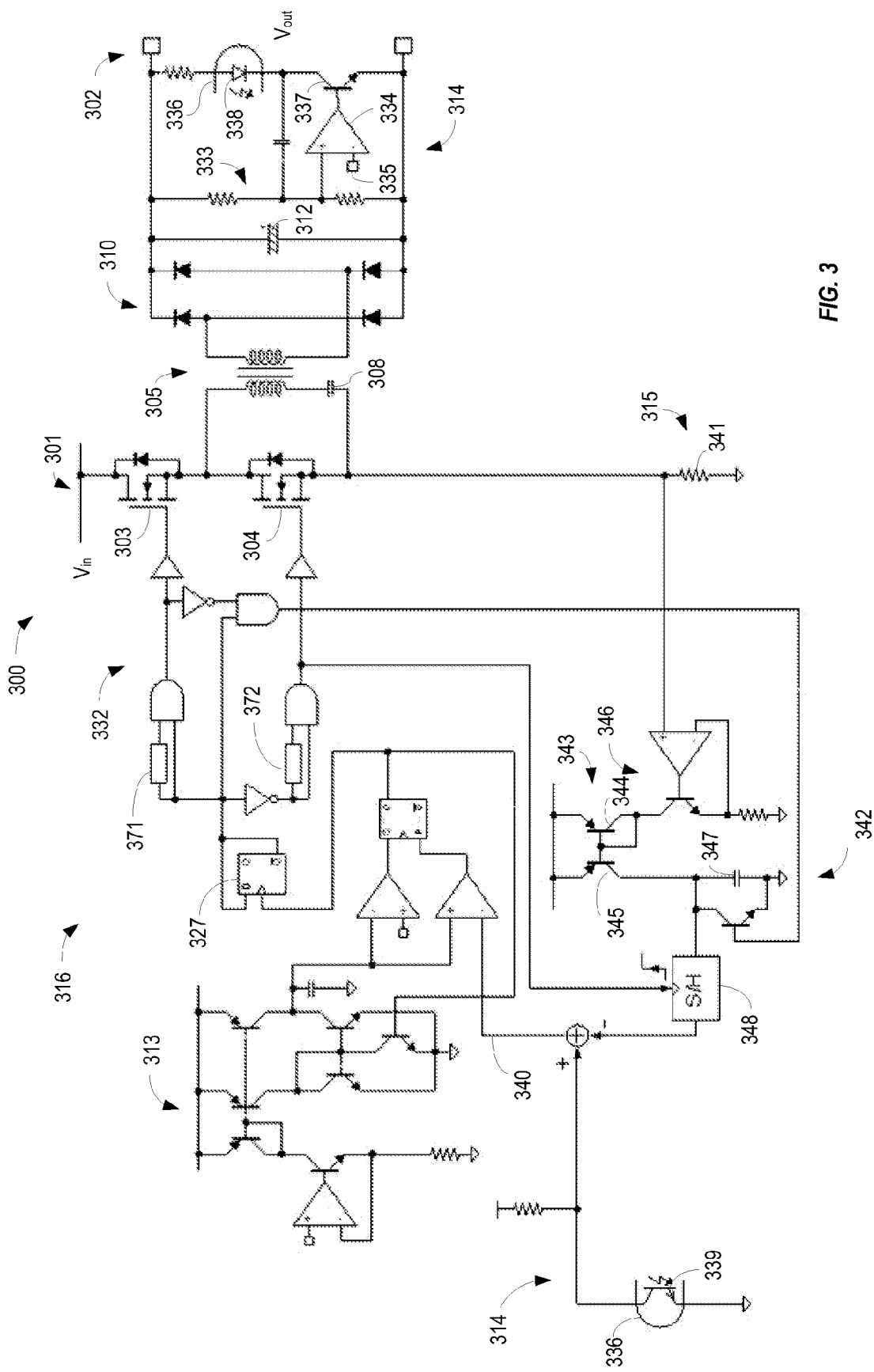
FIG. 3 illustrates generally an example of a half-bridge resonant converter including a controller configured to respond to changing load and input conditions to maintain a desired voltage at the output of a LLC resonant converter.

FIG. 3 illustrates generally an example of a half-bridge resonant converter 300 including a controller 316 configured to respond to changing load and input conditions to maintain a desired voltage at an output 302 of an LLC resonant converter. The half-bridge resonant converter 300 can include a first switch 303, a second switch 304, an integrated transformer 305 including a magnetizing inductance, a resonant inductance, and a resonant capacitance 308, and a rectifier circuit 310 including a load capacitor 312. The first switch 303 and the second switch 304 can operate to apply a first alternating current (AC) waveform on the primary winding of the transformer 305. A second AC waveform induced by the first AC waveform can be rectified and converted to a DC voltage at the output 302 of the half-bridge resonant converter 300. The controller 316 can include a VCO 313, switching logic 332 coupled to the output of the controller 316, and the control inputs of the first and second switches 303, 304. In an example, the controller 316 can include a frequency divider 327 to balance the duty cycle of the first and second switches 303, 304. In an example, a feedback circuit can receive operating information of the half-bridge resonant converter 300 and can adjust inputs to the controller 316 to maintain a desired DC voltage at the output 302 of the half-bridge resonant converter 300.

In the example of FIG. 3, an output voltage sensor 314 can provide error information to adjust an upper threshold of the controller 316. The output voltage sensor 314 can include a voltage divider 333 to provide a sample of the output voltage, a comparator 334 to receive and process the sampled voltage, such as to compare the sampled voltage to a reference 335 to provide error information at the output of the comparator 334. In an example, the sensor 314 can communicate the error information to the controller 316 using an optical coupler 336. In an example, a transistor 337 modulates current through a circuit including the light source 338 of the optical coupler 336 in response to the error information provided by the comparator 334. A phototransistor 339 of the optical coupler 336 modulates current through a circuit coupled to the controller 316 in response to the light emitted from the light source 338 of the optical coupler 336. The circuit can convert the modulated current into a voltage indicative of the error information and modifies the upper threshold 340 of the controller 316 in response.

In the example of FIG. 3, an input current sensor 315 can provide information related to the source $V_{in}$ coupled to an input 301 of the half-bridge resonant converter 300. The inventor has recognized that input current information can be used as feed forward control information to compensate for changing conditions of the source $V_{in}$ coupled to the input 301. For example, a change in the voltage of the source can result in a change in the conduction current through the first switch 303 as well as a change in the DC voltage at the output 302 of the half-bridge resonant converter 300. The circuit of FIG. 3 can include a current sensor 315 to sample inductor current during the conduction of the first switch 303. The current sensor 315 can include a resistor 341 coupled in series with the primary winding of the transformer 305 of the half-bridge resonant converter 300. The resistor 341 can provide information indicative of the inductor current to the controller 316. The controller 316 can include a feed forward circuit 342 to process the information indicative of the inductor current and use the information to adjust a threshold 340 of the controller 316. The threshold adjustments can compensate for variations of the source $V_{in}$ detected using the current sensor 315 such that the effect of the source variations on the output voltage of the converter are reduced or eliminated.

In an example, the feed forward circuit 342 can integrate the sampled voltage to provide a voltage indicative of an operating condition of the source $V_{in}$, such as a voltage of the source 301 $V_{in}$. The feed forward circuit 342 can include a current mirror 343 having a sense transistor 344 and a mirror transistor 345. The sense transistor 344 can be coupled to a current source 346 configured to generate a current proportional to a voltage received from the current sensor 315. The mirror transistor 345 can provide a current proportional to the sensed current to charge a capacitor 347 of the feed forward circuit 342. The voltage across the feed forward capacitor 347 can be received by a sample and hold circuit 348. In an example, the feed forward capacitor 347 of the feed forward circuit 342 can be discharged at the conclusion of the conduction cycle of the second switch 304 and can be allowed to charge during the conduction cycle of the first switch 303. In an example, as illustrated in FIG. 3, at the commencement of the conduction cycle of the second switch 304, the sample and hold circuit 348 can receive the voltage across the feed forward capacitor 347 and hold that value on an output of the sample and hold circuit 348. The held value can be processed with the voltage error information and an upper threshold 340 of the controller 316 can be adjusted, such as an upper threshold of a charge circuit of the VCO 313. Adjusting the upper threshold 340 of the controller 316 can alter the switching frequency of the first and second switches 303, 304 to control the DC voltage at the output 302 of the half-bridge resonant circuit 300.

In certain examples, the switching logic 332 includes first and second delay elements 371, 372 to delay turning "on" one switch an interval of time after turning "off" the other switch, or vice versa. In certain examples, the delay can help reduce switch losses by providing switching under zero voltage conditions. The delay can also reduce switching noise and improve overall efficiency of a resonant converter system.

Figure 4:
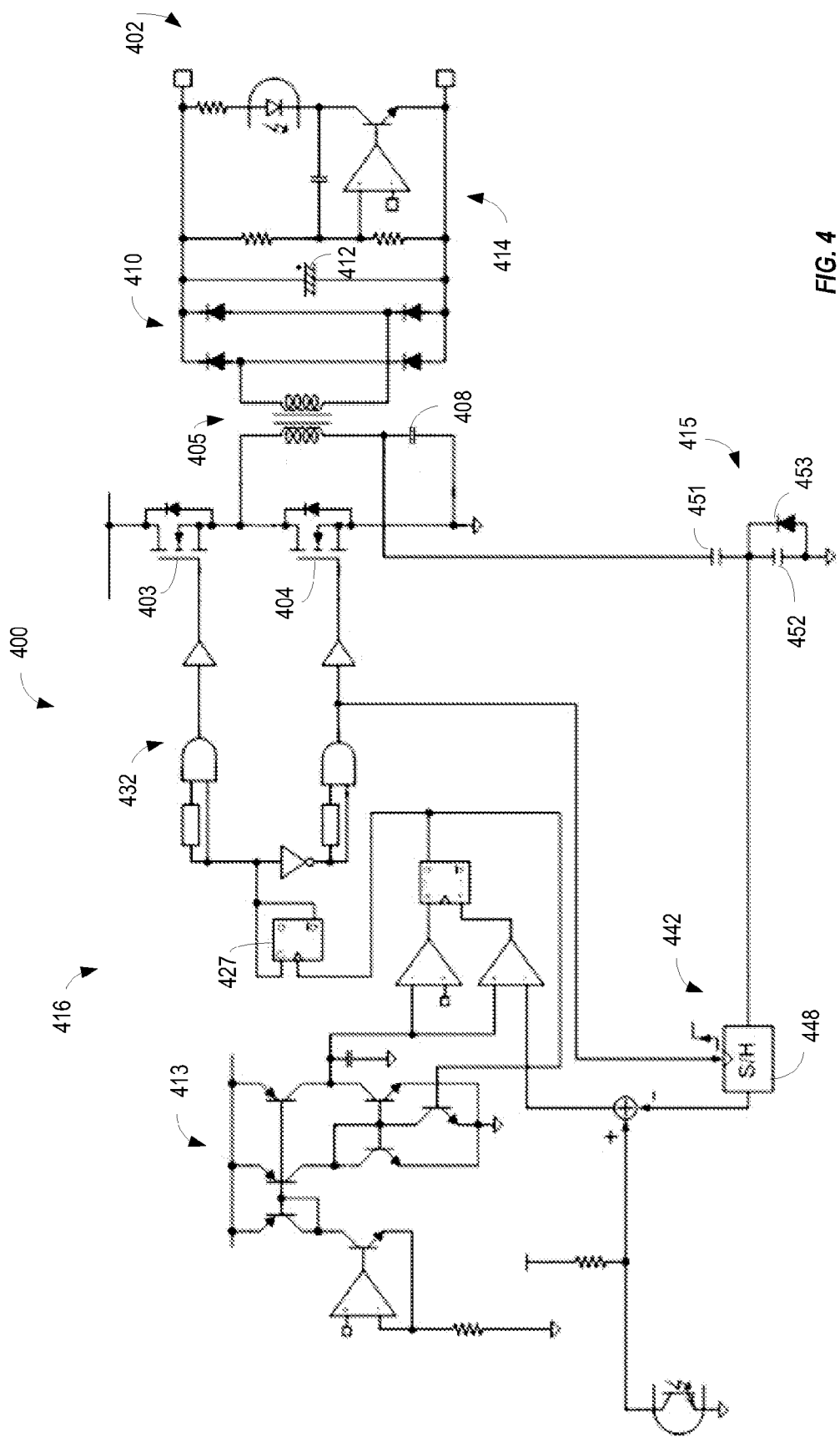
FIG. 4 illustrates generally an example of a half-bridge resonant converter including an alternative controller topology.

FIG. 4 illustrates generally an example of a half-bridge resonant converter 400 including an alternative controller topology configured to respond to changing load and input conditions to maintain a desired DC voltage at an output 402 of the half-bridge resonant converter 400. In an example, the half-bridge resonant converter 400 can include a first switch 403, a second switch 404, an integrated transformer 405 including a magnetizing inductance, a resonant inductance, and a resonant capacitance 408, and a rectifier circuit 410 including a load capacitor 412. In an example, a controller 416 can include a VCO 413, switching logic 432 coupled to the output of the controller 416 and the control inputs of the first and second switches 403, 404. In an example, the controller 416 can include a frequency divider 427 to balance the duty cycle of the first and second switches 403, 404. In an example, feedback circuits 414, 442 can receive operating information of the half-bridge resonant converter 400 and can adjust inputs to the controller 416 in response to changing input line and output load conditions to maintain a desired DC voltage at the output 402 of the half-bridge resonant converter 400.

In the example of FIG. 4, the half-bridge resonant converter 400 can include a current sensor 415 including a capacitive voltage divider 450 having series connected first and second capacitors 451, 452 coupled in parallel with the resonant capacitor 408. During a conduction cycle of the first switch 403, the second capacitor 452 can charge, thus, integrating the inductor current and providing a voltage indicative of that integration at the input of a sample and hold circuit 448. The capacitive voltage divider 415 can provide a substantially lossless current sensor compared to the example of FIG. 3. In some examples, the voltage across the resonant capacitor 408 can become negative with respect to the ground reference. In certain examples, a diode 453 coupled across the second sensor capacitor 452 can level shift the voltage waveform such that the sampled waveform remains at or above the ground reference.

Figure 5:
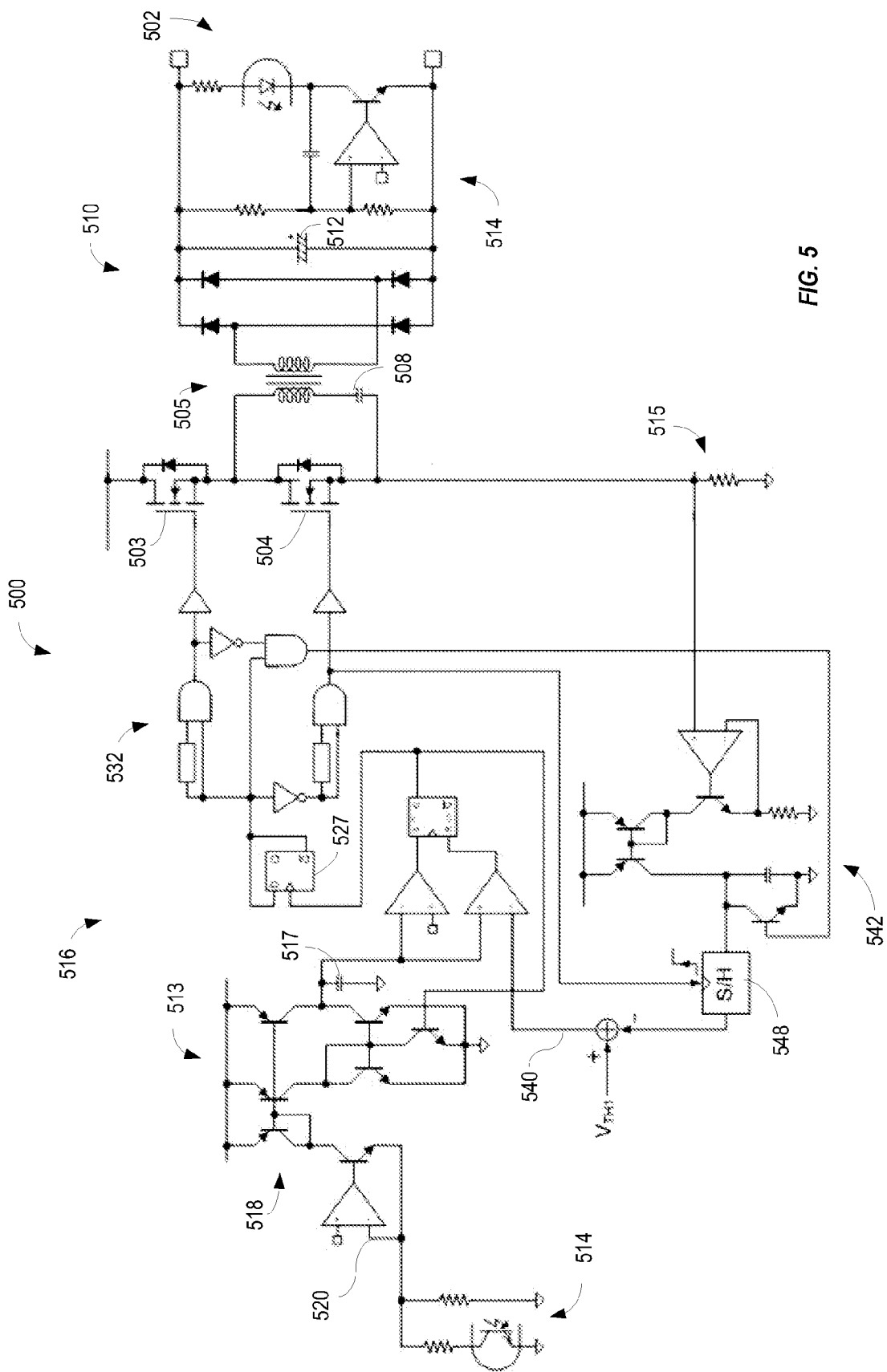
FIG. 5 illustrates generally an example of a half-bridge resonant converter including an alternative controller topology.

FIG. 5 illustrates generally an example of a half-bridge resonant converter 500 including an alternative controller topology configured to respond to changing load and input conditions to maintain a desired voltage at an output 502 of the half-bridge resonant converter 500. The half-bridge resonant converter 500 can include a first switch 503, a second switch 504, an integrated transformer 505 including a magnetizing inductance, a resonant inductance, and a resonant capacitance 508, and a rectifier circuit 510 including a load capacitor 512. A controller 516 can include a VCO 513, switching logic 532 coupled to the output of the controller 516 and the control inputs of the first 503 and second 504 switches. In an example, the controller 516 can include a frequency divider 527 to balance the duty cycle of the first 503 and second 504 switches. In an example, feedback circuits 514, 542 can receive operating information of the half-bridge resonant converter 500 and can adjust inputs to the controller 516 in response to changing input line and output load conditions to maintain a desired DC voltage at the output 502 of the half-bridge resonant converter 500.

The half-bridge resonant converter 500 can include a resistive current sensor 515 to control an upper threshold 540 of the controller 516. The controller 516 can include a feed forward circuit 542, such as described above with reference to FIG. 3. The output of the sample and hold circuit 548 can be subtracted from an upper threshold reference 555 to establish the upper threshold 540 of the controller 516.

In an example, the half-bridge resonant converter 500 can include an output voltage sensor 514, such as discussed above with reference to FIG. 3. The controller 516 can receive an output of the voltage sensor 514 at a control input 520 of a current mirror device 518 of the controller 516. In an example, voltage changes reflected in the output of the output voltage sensor 514 can be configured to adjust at least one of the charge rate or discharge rate of a capacitor 517. Consequently, changes in at least one of the charge rate or discharge rate of the capacitor 517 can modify the frequency of the controller 516 and, in turn, can adjust the gain of the half-bridge resonant converter 500 to control the DC voltage at the output 502.

Figure 6:
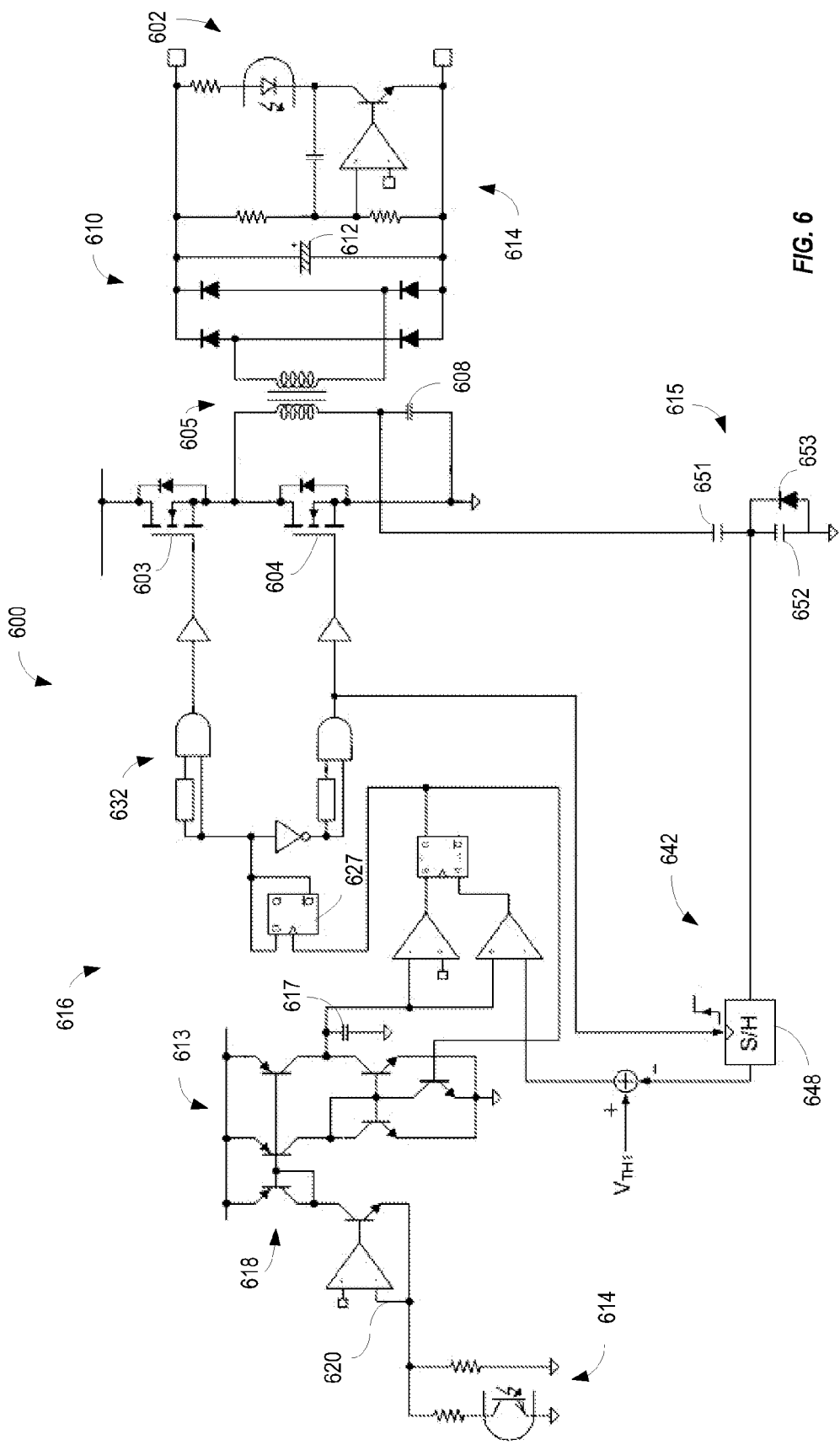
FIG. 6 illustrates generally an example of a half-bridge resonant converter including an alternative controller topology.

FIG. 6 illustrates generally an example of a half-bridge resonant converter 600 including an alternative controller topology configured to respond to changing load and input conditions to maintain a desired output voltage. The half-bridge resonant converter 600 can include a first switch 603, a second switch 604, an integrated transformer 605 including a magnetizing inductance, a resonant inductance, and a resonant capacitance 608, and a rectifier circuit 610 including a load capacitor 612. A controller 616 can include a VCO 613, switching logic 632 to receive an output of the controller 616 and to control the first 603 and second 604 switches. The half-bridge resonant converter 600 can include a feedback circuit 614 and a feed forward circuit 642. In an example, the controller 616 can include a frequency divider 627 to balance the duty cycle of the first and second switches 603, 604. In an example, the feedback circuit 614 and the feed forward circuit 642 can receive operating information of the half-bridge resonant converter 600 and can adjust inputs to the controller 616 in response to changing input line and output load conditions to maintain a desired DC voltage at an output 602 of the half-bridge resonant controller 600.

In the example of FIG. 6, the half-bridge resonant converter 600 can include a current sensor 615 having a capacitive voltage divider including series connected first and second capacitances 651, 652 coupled in parallel with the resonant capacitor 608 of the half-bridge resonant converter 600. During a conduction cycle of the first switch 603, the second capacitor 652 can charge, thus, integrating the inductor current and providing a voltage indicative of that integration at the input of a sample and hold circuit 648. The capacitive voltage divider can provide a substantially lossless current sensor 615, for example, compared to the voltage sensor of the examples illustrated in FIGS. 3 and 5. In some examples, the voltage across the resonant capacitor 508 can become negative with respect to the ground reference. A diode 653 coupled across the second sensor capacitor 652 can level shift the voltage waveform such that the sampled waveform remains at or above the ground reference, in some examples.

The example of FIG. 6 can include an output voltage sensor 614 to control a ramp rate of the controller 616. The controller 616 can receive an output of the voltage sensor 614 at a control input 620 of a current mirror device 618. Voltage changes reflected in the output of the output voltage sensor 614 can adjust at least one of the charge rate and the discharge rate of the capacitor 617. Consequently, changes in at least one of the charge rate or the discharge rate of the capacitor 617 can modify the frequency of the controller 616 and in turn adjust the gain of the half-bridge resonant converter 600 to control the DC voltage at the output 602.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus to control a converter, the apparatus comprising:
   a first input configured to receive first information indicative of an operating condition of the converter;
   an output configured to couple to a switch of the converter;
   a voltage-controlled oscillator (VCO) configured to provide a first pulse train having a first frequency, and to modulate the first frequency responsive to the first information;
   a frequency divider configured to provide a second pulse train to the output, the second pulse train having a second frequency lower than the first frequency;

wherein the VCO includes a threshold comparator to generate the first pulse train; and wherein the VCO is configured to adjust a threshold input of the threshold comparator in response to the first information.

2. The apparatus of claim 1, wherein the first information includes information indicative of an output voltage of the converter.

3. The apparatus of claim 1, wherein the first information includes information indicative of conduction current of an inductor of the converter.

4. The apparatus of claim 1, including a second input circuit configured to receive second information indicative of an operating condition of the converter.

5. The apparatus of claim 4, including an inductor;
wherein the first information includes information indicative of an output voltage of the converter; and
wherein the second information includes information indicative of conduction current of the inductor.

6. The apparatus of claim 5, wherein the VCO is configured to adjust the first frequency using the first information and the second information.

7. The apparatus of claim 1, wherein the VCO is configured to provide the first pulse train using a triangular waveform having a ramp rate and to adjust the ramp rate in response to the received information.

8. The apparatus of claim 1, wherein the output includes first and second outputs, the first output coupled to a first switch of the converter, and the second output coupled to a second switch of the converter; and
wherein the second frequency is about half of the first frequency to equalize the duty cycle of the first and second switches.

9. A method to control a converter, the method comprising:
receiving first information indicative of an operating condition of the converter;
providing a first pulse train having a first frequency using a voltage-controlled oscillator (VCO);
modulating the first frequency in response to the received information;
providing a second pulse train to an output coupled to a switch of the converter;
adjusting a second frequency of the second pulse train using the first pulse train and a frequency divider;
wherein the receiving first information includes sensing a voltage indicative of current flow through a primary winding of a transformer of the converter while the switch is conducting; and
wherein the sensing a voltage indicative of current flow includes:
sensing a resistor voltage indicative of current flow through the primary winding;
generating a current proportional to the resistor voltage;
charging a feedback capacitor using the proportional current;
sampling and holding a value of a voltage of the feedback capacitor when a second switch of the converter is conducting; and
processing the sampled value with a threshold reference value to set a threshold of the VCO.

10. The method of claim 9, wherein the receiving first information includes sensing error information indicative of an error between an output voltage of the converter and a desired output voltage.

11. The method of claim 10, wherein the modulating the first frequency includes adjusting a ramp rate of the VCO using the error information.

12. The method of claim 9, wherein the adjusting the second frequency includes dividing the first frequency of the first pulse train by two using the first pulse train and the frequency divider.

13. A system comprising:
a converter including:
a transformer;
first and second switches coupled to the transformer, the first and second switches configured to provide a first alternating current (AC) signal to a primary winding of the transformer; and
an output rectifier configured to rectify a second alternating signal from a secondary winding of the transformer to generate a direct current (DC) voltage at an output of the converter;
a controller coupled to control inputs of the first and second switches, the controller configured to switch the first and second switches in a complementary fashion to generate the first AC signal, wherein the controller includes
a voltage-controlled oscillator (VCO) configured to provide a first pulse train at a first frequency and a second pulse train at a second frequency to control the switching of the first and second switches;
wherein the second frequency is about half of the first frequency to equalize a duty cycle of the first and second switches;
wherein the VCO includes a threshold comparator to generate the first pulse train; and
wherein the VCO is configured to adjust a threshold input of the threshold comparator in response to the first information; and
a first sensor circuit configured to sense an operating condition of the converter and to adjust the first frequency of the VCO each switch cycle of the first switch in response to the sensed operating condition to maintain a desired DC voltage at the output of the converter.

14. The system of claim 13, wherein the first sensor circuit includes a voltage sensor coupled to the output rectifier, the voltage sensor configured to provide error information using a comparison of the desired DC voltage and the DC voltage at the output of the converter.

15. The system of claim 14, wherein the first sensor circuit is configured to adjust a threshold of the VCO using to the error information.

16. The system of claim 15, wherein the VCO includes a charging circuit; and
wherein the threshold includes an upper threshold of the charging circuit.

17. The system of claim 14, wherein the VCO includes a charging circuit; and
wherein the first sensor circuit is configured to adjust a ramp rate of the charging circuit using the error information.

18. The system of claim 13, wherein the converter includes an inductor; and
wherein the first sensor circuit includes a current sensor configured to sense the inductor current during a conduction cycle of the first switch.

19. The system of claim 18, wherein the converter includes a resonant capacitor; and
wherein the current sensor includes a resistive load coupled in series with the resonant capacitor.

20. The system of claim 18, wherein the converter includes a resonant capacitor; and wherein the current sensor includes a capacitive voltage divider coupled in parallel with the resonant capacitor.

* * * * *